US012755574B2

(12) United States Patent
Seo et al.

(10) Patent No.: US 12,755,574 B2
(45) Date of Patent: Oct. 6, 2026

(54) METHOD AND APPARATUS FOR DE-IDENTIFYING A FACE IN AN IMAGE IN A NATURAL WAY

(71) Applicant: ELECTRONICS AND TELECOMMUNICATIONS RESEARCH INSTITUTE, Daejeon (KR)

(72) Inventors: Yong-Seok Seo, Daejeon (KR); Jung-hyun Kim, Daejeon (KR); Hye-Mi Kim, Daejeon (KR); Jee Hyun Park, Daejeon (KR); Dong-Hyuck Im, Daejeon (KR); Wonyoung Yoo, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 103 days.

(21) Appl. No.: 18/638,891

(22) Filed: Apr. 18, 2024

(65) Prior Publication Data

US 2025/0061625 A1 Feb. 20, 2025

(30) Foreign Application Priority Data

Aug. 17, 2023 (KR) ........................ 10-2023-0107470

(51) Int. Cl.
*G06T 11/60* (2026.01)
*G06V 10/77* (2022.01)
*G06V 40/16* (2022.01)

(52) U.S. Cl.
CPC .......... *G06T 11/60* (2013.01); *G06V 10/7715* (2022.01); *G06V 40/171* (2022.01); *G06V 40/178* (2022.01)

(58) Field of Classification Search
CPC ......... G06T 11/60; G06T 3/10; G06T 3/4046; G06T 7/337; G06T 19/20;
(Continued)

(56) References Cited

U.S. PATENT DOCUMENTS

| | | | |
|---|---|---|---|
| 10,915,574 | B2 | 2/2021 | Im et al. |
| 2020/0104574 | A1 | 4/2020 | Han et al. |

(Continued)

FOREIGN PATENT DOCUMENTS

| | | | |
|---|---|---|---|
| KR | 10-1904924 B1 | | 10/2018 |
| KR | 10-2020-0036656 A | | 4/2020 |

(Continued)

OTHER PUBLICATIONS

Oran Gafni et al., "Live Face De-Identification in Video", arXiv:1911.08348v1 [cs.LG], Nov. 19, 2019.

(Continued)

*Primary Examiner* — Jin Cheng Wang
(74) *Attorney, Agent, or Firm* — LRK PATENT LAW FIRM

(57) ABSTRACT

A variety of exemplary embodiments for processing images are disclosed. In an exemplary embodiment, an image processing method includes a step of extracting a first face feature from an input image including a first face image, a step of generating a second face feature by combining the extracted first face feature with a virtual face feature, a step of generating a second face image on the basis of the generated second face feature, and a step of generating an output image by substantially replacing the first face image with the generated second face image in the input image.

14 Claims, 11 Drawing Sheets

(58) Field of Classification Search
CPC G06T 2207/20084; G06T 2207/30201; G06V 10/7715; G06V 40/171; G06V 40/178; G06V 10/82; G06V 40/168
See application file for complete search history.

(56) References Cited

U.S. PATENT DOCUMENTS

| | | | | |
|---|---|---|---|---|
| 2021/0295483 | A1* | 9/2021 | Huang | G06N 3/045 |
| 2022/0012362 | A1 | 1/2022 | Kuta et al. | |
| 2023/0169709 | A1 | 6/2023 | Im et al. | |
| 2023/0326016 | A1* | 10/2023 | Zhang | G06V 10/764 382/128 |
| 2024/0153041 | A1* | 5/2024 | He | G06T 5/50 |
| 2024/0193822 | A1* | 6/2024 | Chen | G06T 3/40 |
| 2025/0054108 | A1* | 2/2025 | He | G06T 9/00 |
| 2025/0166411 | A1* | 5/2025 | Shu | G06V 10/82 |

FOREIGN PATENT DOCUMENTS

| | | | |
|---|---|---|---|
| KR | 10-2409988 | B1 | 6/2022 |
| KR | 10-2420890 | B1 | 7/2022 |
| KR | 10-2023-0006081 | A | 1/2023 |
| KR | 10-2023-0080111 | A | 6/2023 |

OTHER PUBLICATIONS

Amin Jourabloo et al., “Attribute Preserved Face De-identification”, 2015 International Conference on Biometrics (ICB), May 2015.

* cited by examiner

<Residual down-sampling block>

<Residual up-sampling block> before applying a blending　　　　after applying a blending

METHOD AND APPARATUS FOR DE-IDENTIFYING A FACE IN AN IMAGE IN A NATURAL WAY

CROSS REFERENCE TO RELATED APPLICATION

The present application claims priority to Korean Patent Application No. 10-2023-0107470, filed on Aug. 17, 2023, the entire contents of which are incorporated herein for all purposes by this reference.

BACKGROUND

1. Technical Field

The present disclosure relates to an image processing technology and, more particularly, to a technology for processing an image including a face image.

2. Description of Related Art

With the development of smart devices and networks, it is very easy to share with others various video data generated by individuals over the Internet. However, this has led to increasing concerns about portrait rights and privacy infringement of faces included in the videos.

To solve this problem, a face area in an image is processed in a blurred or mosaic manner in conventional technologies to prevent facial recognition. However, when such a technique is applied, there may be a problem that the quality of an image is degraded and a user's concentration on the image is disrupted.

SUMMARY

Therefore, there may be a need for technology to de-identify a face in an image (e.g., so that there are no portrait rights issues and/or privacy infringement issues) in a natural way (e.g., while maintaining the quality of contents).

One aspect of the present disclosure in an image processing method implemented as an electronic device may provide an image processing method that includes a step of extracting a first face feature (FF_1) from an input image including a first face image, a step of generating a second face feature by combining the extracted first face feature with a virtual face feature, a step of generating a second face image on the basis of the generated second face feature, and a step of generating an output image by substantially replacing the first face image with the generated second face image in the input image.

Another aspect of the present disclosure may provide an image processing apparatus that includes a first face feature extraction unit that extracts a first face feature from an input image including a first face image, a second face feature generation unit that generates a second face feature by combining the extracted first face feature with a virtual face feature, a second face image generation unit that generates a second face image based on the generated second face feature, and an output image generation unit that generates an output image by substantially replacing the first face image with the generated second face image in the input image.

Another aspect of the present disclosure may be a processor as an electronic device, wherein the processor provides a recording medium that allows the processor to perform exemplary embodiments of the present disclosure in a non-transitory recording medium that stores readable instructions.

This overview is provided to introduce in a simplified form the selected concepts among those that are further explained in the detailed description below. The present disclosure is not intended to identify a core feature or essential feature of the subject matter of the claimed disclosure and is not intended to be used to limit the scope of the subject matter of the claimed disclosure. Also, the subject matter of the claimed disclosure is not limited to implementations that solve some or all of the problems mentioned in any part of the present specification. In addition to the above exemplary aspects, exemplary embodiments and features, additional aspects, embodiments, and features will become apparent with reference to the detailed description and drawings below.

Some exemplary embodiments of the present disclosure may have an effect including the following advantages. However, since it is not meant that all exemplary embodiments should include all of them, the scope of the present disclosure should not be understood as being limited thereto.

According to some exemplary embodiments, it may be possible to make a face free from portrait rights by naturally de-identifying the face with the portrait rights within an image.

According to some exemplary embodiments, a natural, high-quality face image may be obtained by generating a new face by estimating age and gender of a face in an original image and then by combining the features of the face matching age and gender among faces generated by an artificial intelligence model.

According to some exemplary embodiments, it may be possible to shorten a face conversion processing time by using the features of the pre-generated AI face images.

DETAILED DESCRIPTION OF THE DISCLOSURE

Since the description of the present disclosure is merely an exemplary embodiment for structural or functional description, the scope of the present disclosure should not be construed as being limited by the exemplary embodiments described in the text. That is, since exemplary embodiments may be changed in various ways and may have various forms, it should be understood that the right scope of the present disclosure includes equivalents that can realize the technical idea. In addition, the objectives or effects presented in the present disclosure may not mean that a specific exemplary embodiment should include all or only such effects, so the right scope of the present disclosure should not be understood as being limited thereto.

Meanwhile, the meaning of the terms described in the present disclosure should be understood as follows.

Terms such as "first", "second", and the like are intended to distinguish one component from another component, and the scope of rights should not be limited by these terms. For example, a first component may be referred to as a second component, and similarly, a second component may also be referred to as a first component.

When a component is referred to as being "connected" to another component, it may be directly connected to the other component, but it should be understood that other components may exist in the middle. On the other hand, when a component is referred to as being "directly connected" to another component, it should be understood that no other component exists in the middle. Meanwhile, other expressions describing the relationship between components, such as "between" and "immediately between" or "neighboring to" and "directly neighboring to", should be interpreted in the same way.

Singular expressions should be understood to include plural expressions unless the context clearly indicates otherwise, and terms such as "include" or "have" are intended to designate the existence of features, numbers, steps, actions, components, parts, or combinations thereof, and should be understood not to preclude the possibilities of the existence or addition of one or more other features or numbers, steps, actions, components, parts, or combinations thereof.

In each step, identification codes (e.g., a, b, c, etc.) may be used for the convenience of explanation, and identification codes may not describe the order of each step, and each step may occur differently from the specified order unless a specific order is explicitly stated in the context. That is, each step may occur in the same order as the specified order, may be performed substantially simultaneously, or may be performed in the opposite order.

Figure 1:
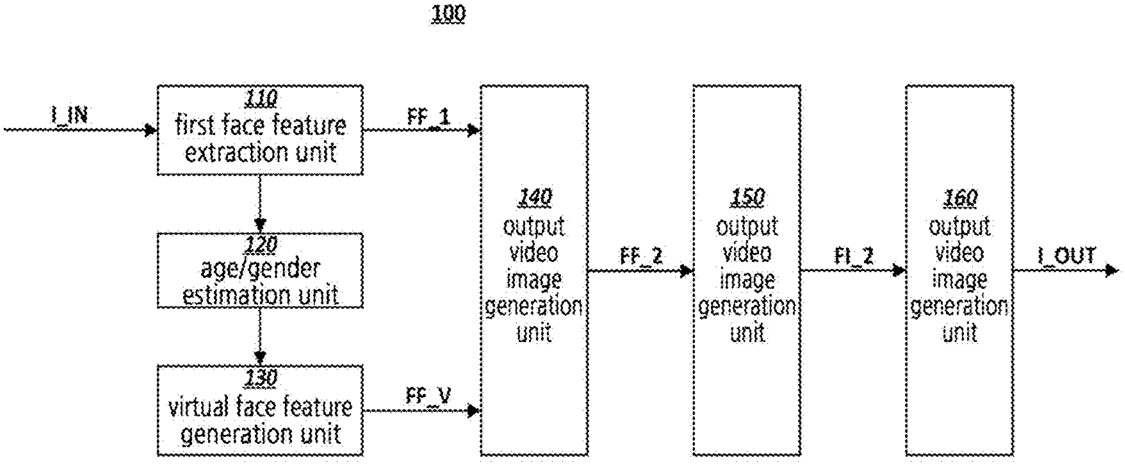
FIG. 1 is a block diagram for describing some exemplary embodiments of an image processing apparatus of the present disclosure.

FIG. 1 is a block diagram for describing some exemplary embodiments of an image processing apparatus of the present disclosure.

Referring to FIG. 1, the image processing apparatus 100 of the present disclosure may include a first face feature extraction unit 110, an age/gender estimation unit 120, a virtual face feature generation unit 130, a second face feature generation unit 140, a second face image generation unit 150, and an output image generation unit 160.

In an exemplary embodiment, the first face feature extraction unit 110 may extract a first face feature (FF_1) from an input image (I_IN) including a first face image. In an exemplary embodiment, the input image (I_IN) may be a video. In another exemplary embodiment, the input image (I_IN) may be a still image.

Figure 2:
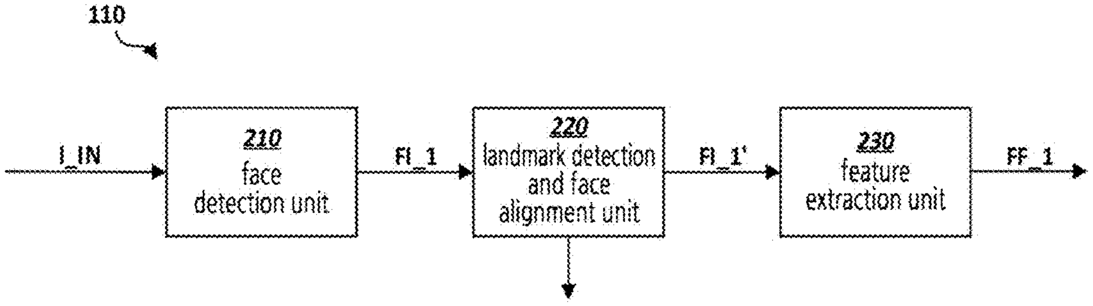
FIG. 2 is a block diagram showing a first face feature extraction unit according to an exemplary embodiment of the present disclosure.

FIG. 2 is a block diagram showing the first face feature extraction unit 110 according to an exemplary embodiment of the present disclosure.

Referring to FIG. 2, the first face feature extraction unit 110 may include a face detection unit 210, a landmark detection and face alignment unit 220, and a feature extraction unit 230.

In an exemplary embodiment, the face detection unit 210 may detect the first face image (FI_1) from the input image (I_IN) including the first face image (FI_1).

In an exemplary embodiment, the landmark detection and face alignment unit 220 may perform a landmark detection and face alignment on the detected first face image (FI_1). For example, the landmark detection and face alignment unit 220 may extract a landmark from the detected first face image (FI_1) and align the size and the angle of the face.

In an exemplary embodiment, the feature extraction unit 230 may extract the first face feature (FF_1) on the basis of the results of the landmark detection and face alignment.

In an exemplary embodiment, referring back to FIG. 1, the age/gender estimation unit 120 may estimate age and gender of a person corresponding to the first face image (FI_1). In the estimating exemplary embodiment, the age/gender estimation unit 120 may estimate age and gender based on information provided from the first face feature extraction unit 110 (e.g., the input image itself, metadata incidentally included in the input image, an intermediate output of the first face feature extraction unit, or a final output of the first face feature extraction unit). For example, the age/gender estimation unit 120 may estimate age and gender based on the resultant image of the landmark detection and face alignment unit 220 of FIG. 2. In another estimating exemplary embodiment, the age/gender estimation unit 120 may estimate age and gender of a face image using publicly available models trained through deep learning.

In an exemplary embodiment, the virtual face feature generation unit 130 may generate a virtual face feature (FF_V) on the basis of an estimation result (e.g., information provided by the age/gender estimation unit) with respect to age and gender of a person corresponding to the first face image (FI_1).

In an exemplary embodiment of determining or obtaining the virtual face feature (FF_V) to be combined, the virtual face feature generation unit 130 may select at least one of a plurality of virtual face features (FF_V) on the basis of at least one of age and gender of a person corresponding to the first face image (FI_1) in a state where a plurality of virtual face features (FF_V) are provided in advance (e.g., generated in advance). In an exemplary embodiment, the virtual face feature generation unit 130 may select one of a plurality of virtual face features (FF_V) on the basis of at least one of age and gender of a person corresponding to the first face image (FI_1).

Figure 3:
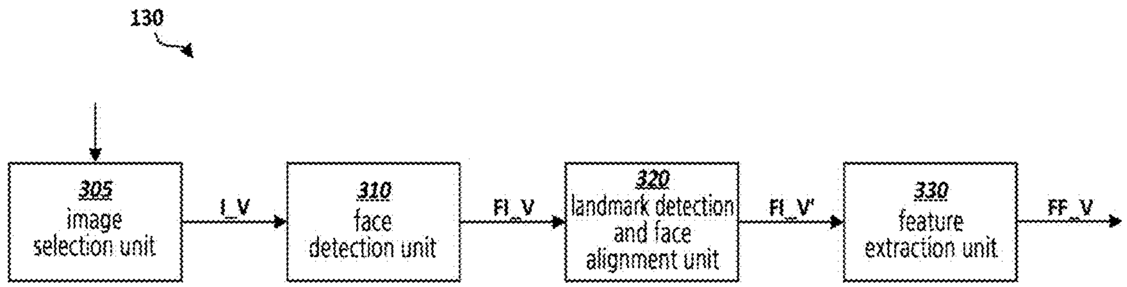
FIG. 3 is a block diagram showing a second face feature generation unit according to an exemplary embodiment of the present disclosure.

In another exemplary embodiment of determining or obtaining the virtual face feature (FF_V) to be combined, as shown in FIG. 3, the virtual face feature generation unit 130 may select at least one pre-generated image (I_V) on the basis of at least one of age and gender of a person corresponding to the first face image (FI_1) in a state where a plurality of pre-generated images (I_V) are provided in advance and may generate a virtual face feature (FF_V) on the basis of the selected, pre-generated image (I_V). In an exemplary embodiment, the virtual face feature generation unit 130 may select one of a plurality of pre-generated images (I_V) on the basis of age and gender of a person corresponding to the first face image (FI_1).

FIG. 3 is a block diagram showing a virtual face feature generation unit 130 according to an exemplary embodiment of the present disclosure.

Referring to FIG. 3, the virtual face feature generation unit 130 may include an image selection unit 305, a face detection unit 310, a landmark detection and face alignment unit 320, and a feature extraction unit 330.

In some exemplary embodiments, the image selection unit 305, the face detection unit 310, the landmark detection and face alignment unit 320, and the feature extraction unit 330 included in the virtual face feature generation unit 130 may be operated to generate in advance (generating using Artificial Intelligence according to an exemplary embodiment) and store a plurality of virtual images (I_V) (hereinafter, a pre-generated image) or a plurality of virtual face features (FF_V), and then to provide the virtual face features (FF_V) to be combined as quickly as possible when each input image (I_IN) is given.

In an exemplary embodiment, the image selection unit 305 may select at least one of a plurality of pre-generated images (I_V) on the basis of the input image (I_IN) in a state where a plurality of pre-generated images (I_V) are provided in advance. In an exemplary embodiment, each pre-generated image (I_V) may include at least one virtual face image (FI_V).

In an exemplary embodiment, the face detection unit 310 may detect at least one virtual face image (FI_V) from at least one selected, pre-generated image (I_V).

In an exemplary embodiment, the landmark detection and face alignment unit 320 may perform a landmark detection and face alignment on the detected virtual face image (FI_V).

In an exemplary embodiment, the feature extraction unit 330 may extract the virtual face feature (FF_V) from the results of the landmark detection and face alignment.

In an exemplary embodiment referring back to FIG. 1, a second face feature generation unit 140 may generate a second face feature (FF_2) by combining the extracted first face feature (FF_1) with the generated virtual face feature (FF_V). In an exemplary embodiment, the second face feature generation unit 140 may be implemented through a mapping network in order to naturally combine a unique feature information of the virtual face generated by artificial intelligence while maintaining external features (hair style/color, facial expression, glasses, and the like) of a face included in the input image. In an exemplary embodiment, the mapping network may receive two vectors (e.g., FV_1 and FV_V) as input and output one vector (e.g., FV_2). In an exemplary embodiment, the output vector may be a network that is trained not to distort the original, that is, the input image while reflecting the image information of the two input vectors. The mapping network will be described later in FIG. 4 and elsewhere.

In an exemplary embodiment, a second face image generation unit 150 may generate a second face image (FI_2) on the basis of the generated second face feature (FF_2).

In an exemplary embodiment, an output image generation unit 160 may generate an output image (I_OUT) by substantially replacing the first face image (FI_1) in the input image (I_IN) with the generated second face image (FI_2). In some exemplary embodiments, such an output image (I_OUT) may be an image that is changed into a natural face while ultimately resolving the portrait rights issues.

In an exemplary embodiment in which the first face image (FI_1) is substantially replaced with the generated second face image (FI_2) in order to generate an output image (I_OUT), the output image generation unit 160 may generate the output image (I_OUT) by combining the generated second face image (FI_2) with the remaining area of the input image (I_IN). In an exemplary embodiment, the remaining area may be an area excluding the area corresponding to the first face image (FI_1) in the input image (I_IN). For example, the output image generation unit 160 may perform both an operation of rearranging the generated second face image (FI_2) to fit the input image (I_IN) with a face rearrangement and blending unit (not shown) and an operation of combining the rearranged second face image (FI_2) with the remaining area after blending the boundary between the rearranged second face image (FI_2) and the remaining area of the input image (I_IN).

Figure 4:
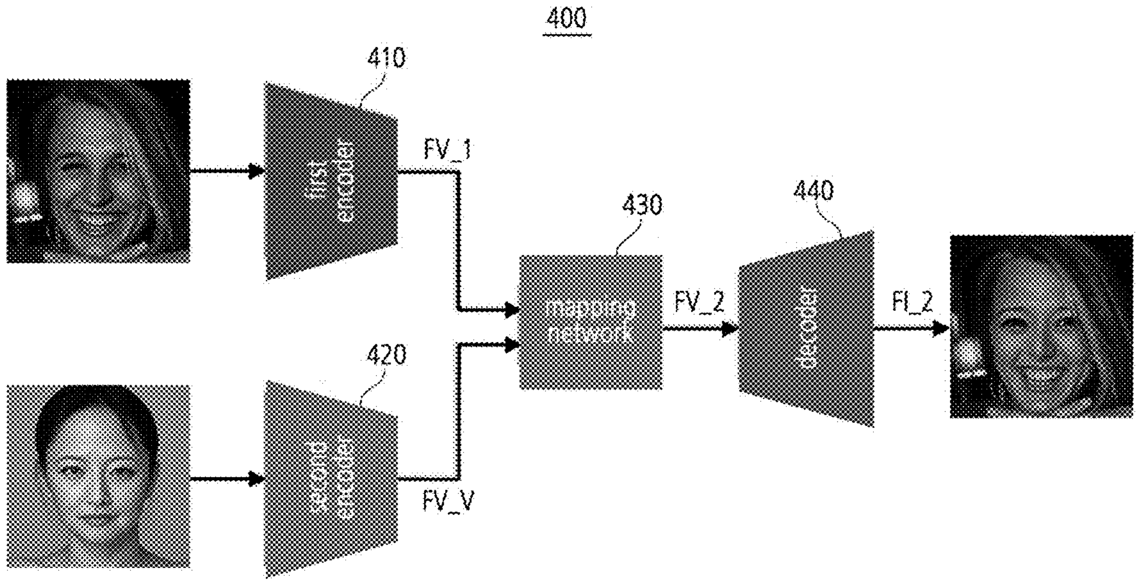
FIG. 4 is a conceptual diagram showing an operation of a system including an encoder, a mapping network, and a decoder according to some exemplary embodiments of the present disclosure.

In an exemplary embodiment with respect to the image processing apparatus 100 of the present disclosure, the feature extraction unit 230 of the first face feature extraction unit 110, the feature extraction unit 330 of the virtual face feature generation unit 130, the second face feature generation unit 140, and the second face image generation unit 430 may include or correspond to a first encoder 410, a second encoder 420, a mapping network 430, and a decoder 440 to be described later with reference to FIG. 4.

FIG. 4 is a conceptual diagram showing an operation of a system including an encoder, a mapping network, and a decoder according to some exemplary embodiments of the present disclosure. FIG. 4 may include an exemplary embodiment in which a first feature vector (FF_1) and a virtual feature vector (FF_V), which are feature vectors, are extracted from each of the face image (FI_1) in the input image and the virtual face image (FI_V) (e.g., an AI-generated face), and a new face image (FI_2) is generated by combining the two feature vectors.

Referring to FIG. 4, a system 400 may include a first encoder 410, a second encoder 420, a mapping network 430, and a decoder 440.

In an exemplary embodiment, the first encoder 410 may generate a first feature vector (FV_1) on the basis of the first face image (FI_1). For example, the first feature vector (FV_1) may correspond to the first face feature (FF_1) described above. In an exemplary embodiment, the first encoder 410, which is an image feature extractor composed of residual blocks, may extract a feature vector (FV_1) of a face in the input image (I_IN) or the first face image (FI_1). In an exemplary embodiment, the first encoder 410 may hierarchically include a plurality of residual down-sampling blocks as described later with reference to FIG. 5.

In an exemplary embodiment, the second encoder 420 may generate the virtual feature vector (FV_V) from the virtual face image (FI_V). In an exemplary embodiment, the second encoder 126 may include a pre-trained ArcFace image encoder as described later with reference to FIG. 5. For example, the ArcFace image encoder may be a highperformance facial feature extractor that uses ResNet50 as a backbone neural network and may extract a 512-dimensional feature vector.

In an exemplary embodiment, the mapping network 430 may generate a second feature vector (FV_2) by combining the first feature vector (FV_1) and the virtual feature vector (FV_V). For example, the virtual feature vector (FV_V) and the second feature vector (FV_2) may correspond to the virtual face feature (FF_V) and the second face feature (FF_2), respectively.

The mapping network 430 according to an exemplary embodiment may generate a second face feature by combining the first face feature (FF_1) of the input image (I_IN) with the virtual face feature (FF_V) (e.g., a feature of the AI-generated face). In an exemplary embodiment, the second face feature generated in this way may be used to generate a de-identified face image.

The mapping network 430 according to an exemplary embodiment may comprise four fully connected layers. The mapping network 430 according to an exemplary embodiment may have input and output vector sizes of 512 and 256, respectively.

Referring to FIG. 4, it may be seen that an output image, which is a new face combined with virtual face features, is generated while maintaining external features (hair style/color, facial expressions) of a face in the input image.

In an exemplary embodiment, the decoder 440 may generate the second face image (FI_2) on the basis of the second feature vector (FV_2). In an exemplary embodiment, the decoder 440 may hierarchically include a plurality of residual up-sampling blocks as described later with reference to FIG. 5.

In an exemplary embodiment, the first encoder 410, the second encoder 420, the mapping network 430, and the decoder 440 may be trained to minimize a total loss function. In an exemplary embodiment, the total loss function may be obtained as a weighted sum of a first loss function and a second loss function. In an exemplary embodiment, the first loss function may be an objective function for increasing a similarity between the second face image (FI_2) and the virtual face image (FI_V). In an exemplary embodiment, the second loss function may be a loss function for reducing a difference between the first face image (FI_1) and a third face image. For example, the third face image may be a face image obtained by decoding the combined face features through the decoder 440 when a face feature obtained by inputting the second face image (FI_2) to the first encoder 410 is combined with a face feature obtained by inputting the first face image (FI_1) to the second encoder 420 through the mapping network 430. In an exemplary embodiment, the first face image used for training here may be a separately prepared training image. Further description of the training process of the present disclosure will be described later with reference to FIG. 7.

Figure 5:
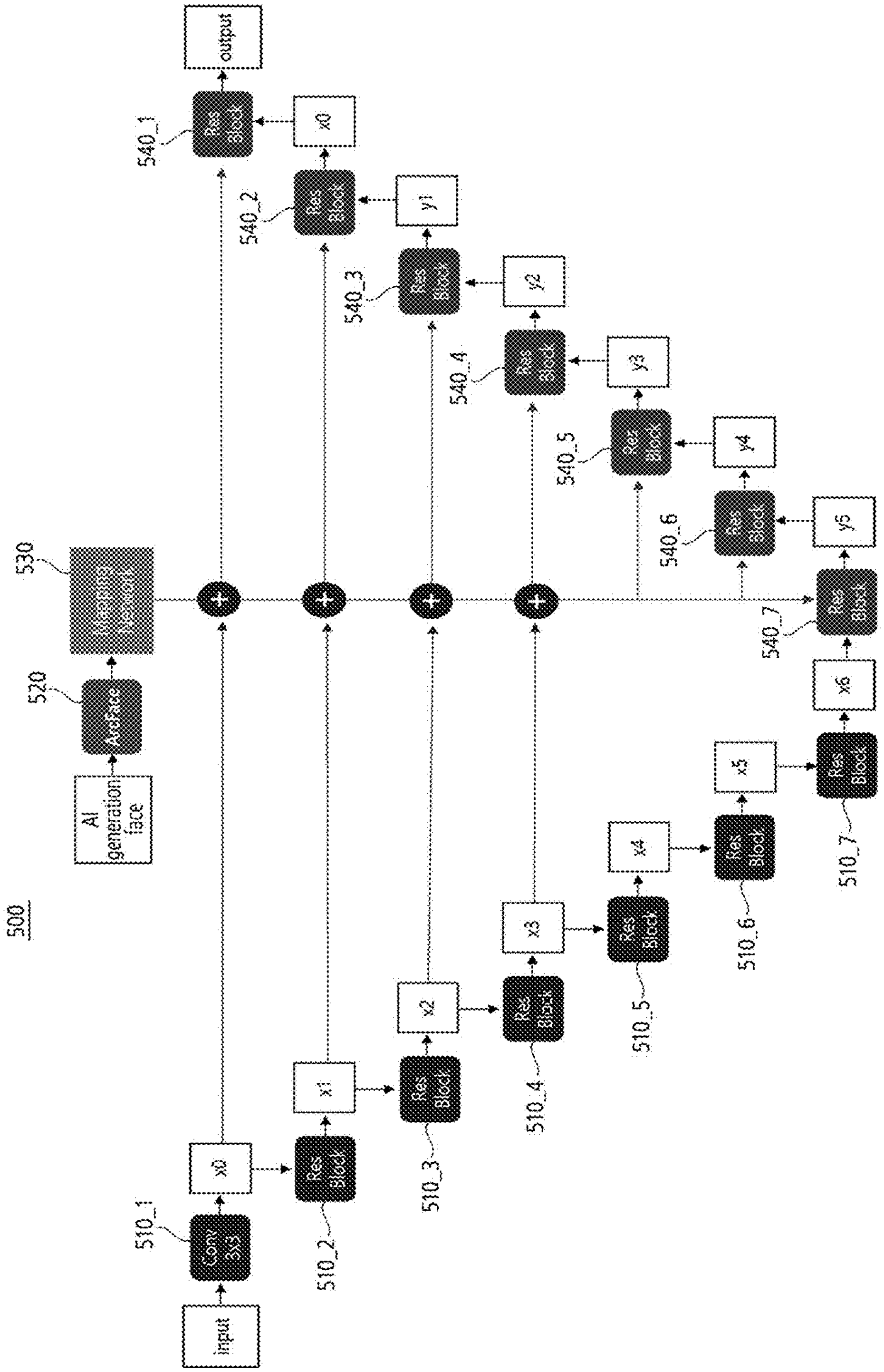
FIG. 5 is a block diagram illustrating a detailed structure of a first encoder, a decoder, and the like of the present disclosure.

FIG. 5 is a block diagram illustrating a detailed structure of a first encoder, a decoder, and the like of the present disclosure.

Referring to FIG. 5, a first encoder (e.g., a first encoder according to some exemplary embodiments of FIG. 4) may include seven first encoder sub-blocks from 510_1 to 510_7, and a decoder (e.g., a decoder according to some exemplary embodiments of FIG. 4) may include seven decoder sub-blocks from 540_1 to 540_7.

Referring to FIG. 5, the ArcFace image encoder 520 may be used as a second encoder (e.g., the second encoder according to some exemplary embodiments of FIG. 4).

Referring to FIG. 5, a system 500 according to an exemplary embodiment may be configured in the form of a U-Net in which the first face image (FI_1) is input to the first encoder comprising residual down-sampling blocks to output each feature vector from x0 to x6 and the compressed features are expanded again when those feature vectors (x0 to x6) pass through the decoder comprising residual up-sampling blocks.

In an exemplary embodiment, the features extracted from the first encoder, the output of the mapping network 530, and the output vectors (y0 to y5) of the previous layer may be input together to each layer of the decoder.

In an exemplary embodiment, the decoder may utilize all of the outputs of a plurality of residual down-sampling blocks.

In another exemplary embodiment, the decoder may utilize only parts of the outputs of a plurality of residual down-sampling blocks. In an exemplary embodiment in which only parts are utilized, the parts may be the outputs of N (a natural number less than M) low-layer residual down-sampling blocks among the outputs (e.g., in the case of M outputs) of a plurality of residual down-sampling blocks.

In another exemplary embodiment, the decoder may utilize all or parts of the outputs of a plurality of residual down-sampling blocks, and may select the outputs to be utilized depending on given conditions. In an exemplary embodiment in which the outputs to be utilized is selected depending on given conditions, the decoder may select and use only L (a natural number less than or equal to M) outputs among the outputs (e.g., M outputs) of a plurality of residual down-sampling blocks, but may adjust (e.g., increasing or decreasing) the L value according to given conditions (e.g., when reflecting more features of the first face image or vice versa).

In an exemplary embodiment as shown in FIG. 5, when inputted to the decoder, the attributes of an output face image may be adjusted by connecting only the outputs of some layers of the first encoder since the feature vectors (x0 to x3) being outputted from the low-layers of the first encoder express well external features (hair style/color, facial expressions) of the input face. For example, in order to express well more features of the first face image (FI_1), the feature vectors (x0 to x4 or x0 to x5) being outputted from more layers of the first encoder may be inputted to the decoder. Conversely, in order to express fewer features of the first face image (FI_1), the attributes of the output face image may be adjusted by connecting the feature vectors (x0 to x2 or x0 to x1) being outputted from fewer low-layers of the first encoder to the decoder.

Figure 6A:
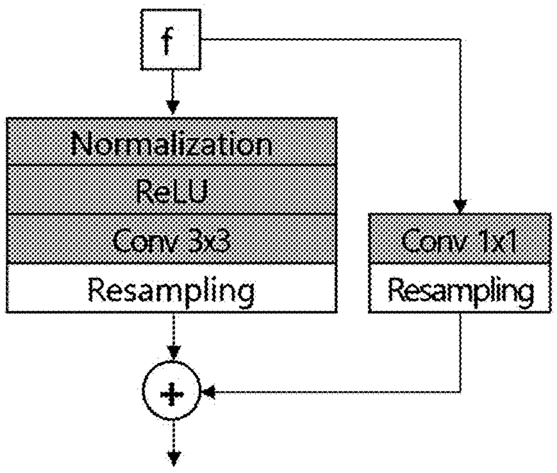
FIGS. 6A and 6B are block diagrams illustrating an exemplary embodiment with respect to a residual block included in a first encoder of FIG. 5 and a residual block included in a decoder of FIG. 5, respectively.
Figure 6B:
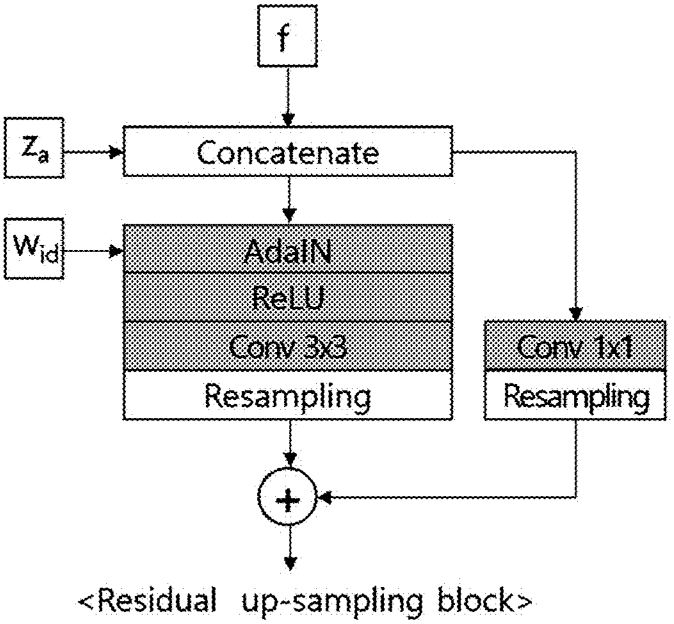

FIGS. 6A and 6B are block diagrams illustrating an exemplary embodiment with respect to a residual block (residual down-sampling blocks) included in the first encoder of FIG. 5 and a residual block (residual up-sampling blocks) included in the decoder of FIG. 5, respectively.

In FIGS. 6A and 6B, 'f' may represent an output vector of a previous layer, and in FIG. 6B, '$z_a$' may represent a feature vector extracted in the first encoder and '$w_{id}$' may represent an output vector of a mapping network. A normalization block included in the residual down-sampling block is a process of normalizing data being inputted to each layer, and a Batch normalization or Instance normalization may be used depending on an exemplary embodiment. The AdaIN block included in the residual up-sampling block may be a layer that changes a style of an image using an average and variance of two vectors. The ReLU block included in the residual up-sampling block and the residual down-sampling block may be a network activation function, and ReLU or Leaky LeRU function may be used depending on an exemplary embodiment. The Conv block included in the residual up-sampling block and residual down-sampling block may refer to a convolution operation. Other blocks labeled as Concatenate, Resampling, and the like are a processing procedure that is commonly used as an ordinary concept in the field of deep learning technology and thus a detailed description thereof may be omitted.

Figure 7:
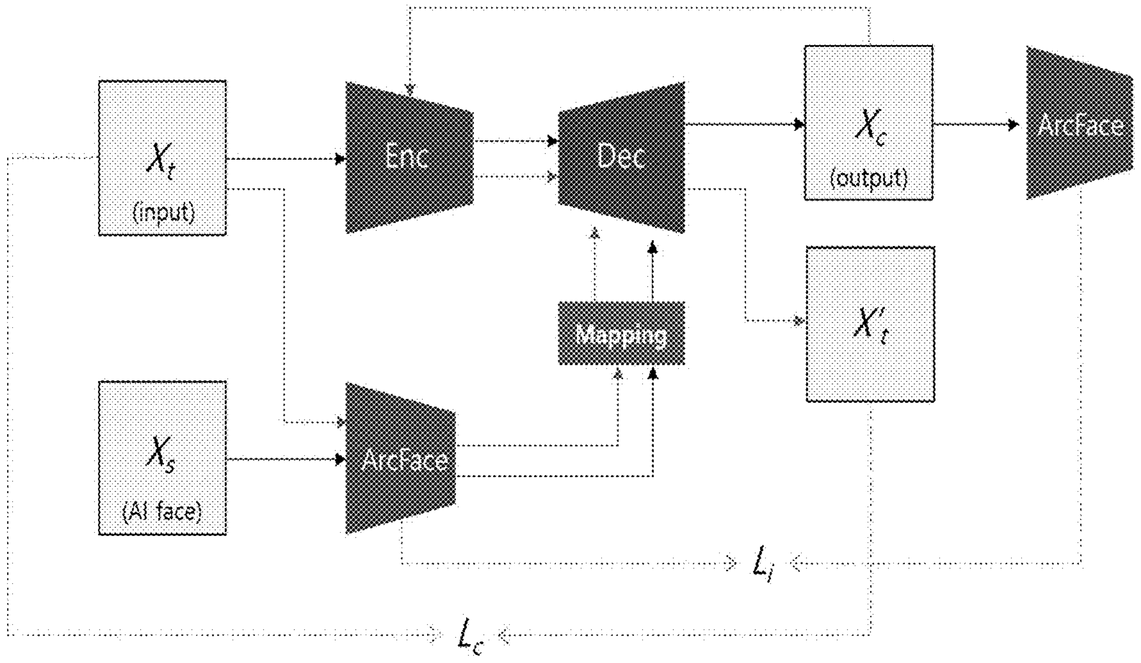
FIG. 7 is a block diagram showing a training process of a system according to an exemplary embodiment of the present disclosure.

FIG. 7 is a block diagram showing a training process of a system according to an exemplary embodiment of the present disclosure.

In some exemplary embodiments, Enc, ArcFace, Mapping, and Dec in FIG. 7 may correspond to the first encoder, the second encoder, the mapping network, and the decoder in some exemplary embodiments described above.

In an exemplary embodiment, the first encoder, the decoder, and the mapping network may be capable of optimizing the performance through a training process. The network loss function ($L_T$) used for training according to an exemplary embodiment is as follows.

$$L_T = \lambda_i L_i + L_c$$

According to the present exemplary embodiment, a network loss function, that is, the total loss function $L_T$ may be determined by a weighted sum of both a first loss function $L_i$ and a second loss function $L_c$, and may be trained to minimize a loss using a network configuration of FIG. 7. Herein, $\lambda_i$ may refer to a weight value used in the weighted sum.

In an exemplary embodiment, the first loss function $L_i$ may be an objective function for increasing a similarity between a virtual face image $X_s$ and an output face image $X_c$. In an exemplary embodiment, a cosine similarity between the feature vectors through the ArcFace image encoder in each image may be maximized as shown in the following equation such that the first loss function $L_i$ may be trained in a direction to be minimized.

$$L_i = 1 - \cos(E(X_s), E(X_c))$$

In an exemplary embodiment, the second loss function $L_c$ may a loss function that makes smaller the difference between the input face image $X_t$ and the face image $X'_t$ that is decoded after combining a feature obtained by re-encoding the output image $X_c$ generated by passing through the encoder-decoder with a feature obtained by passing the input face image $X_t$ through ArcFace image encoder.

$$L_c = \|X_t - X'_t\|, X'_t = D(X_c, E(X_t))$$

In an exemplary embodiment, the entire network may be pre-trained in such a way that the weighted sum of the first and second loss functions becomes smaller, and be used to generate a face with portrait rights protected.

Figure 8:
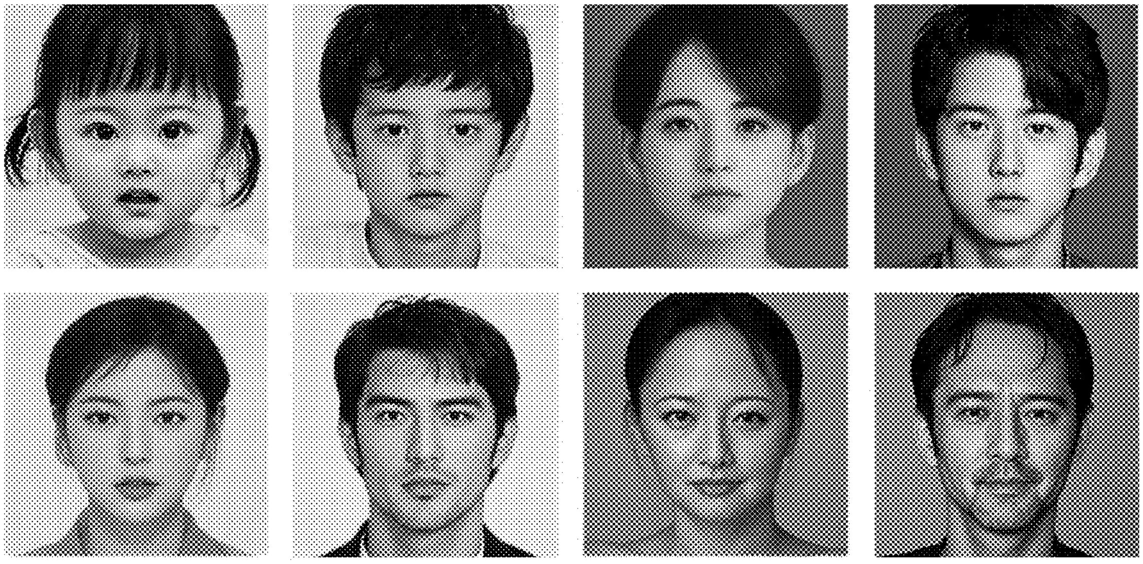
FIG. 8 is a view showing a face image generated by an artificial intelligence in advance on the basis of age and gender according to an exemplary embodiment of the present disclosure.

FIG. 8 is a view showing face images generated in advance by artificial intelligence on the basis of age and gender according to an exemplary embodiment of the present disclosure.

In some exemplary embodiments of the present disclosure, the total processing time may be shortened by generating a face image according to age and gender and then by preparing a feature vector of each face in advance.

Figure 9:
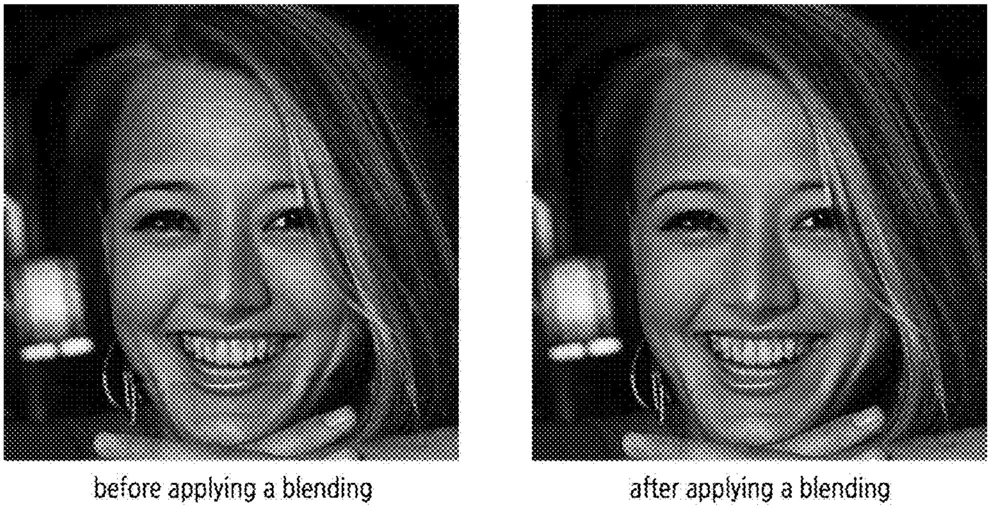
FIG. 9 is a view showing an image resulting from applying blending to prevent quality deterioration of a border area after changing a face detection area to a new face according to an exemplary embodiment of the present disclosure.

FIG. 9 is a view showing resultant images from applying a blending in order to prevent quality deterioration of a boundary area after changing into a new face with respect to the face detection area according to an exemplary embodiment of the present disclosure.

Referring to FIG. 9, it may be seen that the resultant image, the right image, is more natural than the left image at the boundary area by applying a Gaussian filter to the face area changed in the last step of a blending process in order to make the boundary natural.

Figure 10:
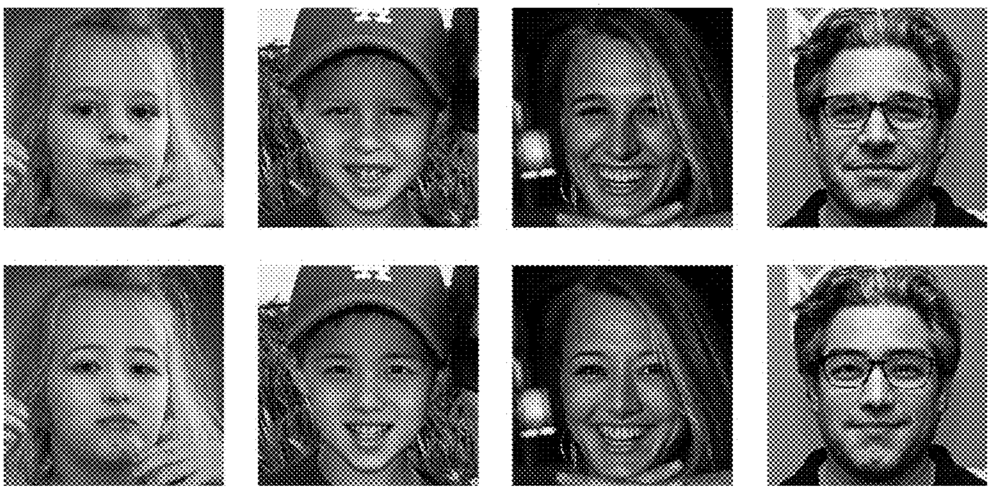
FIG. 10 is a view showing image pairs composed of an original face image and a new face image with portrait rights being protected according to an exemplary embodiment of the present disclosure.

FIG. 10 is a view showing image pairs composed of an original face image and a new face image where portrait rights are protected according to an exemplary embodiment of the present disclosure.

The images located at the upper side may be the original face images, and the face images located at the lower side may be the face images with the portrait rights protected according to an exemplary embodiment of the present disclosure. Referring to FIG. 10, although changed to a person different from the original face, the generated face image may be a natural face image and may seem more natural by combining the AI-generated face features similar to age and gender of the original face.

Figure 11:
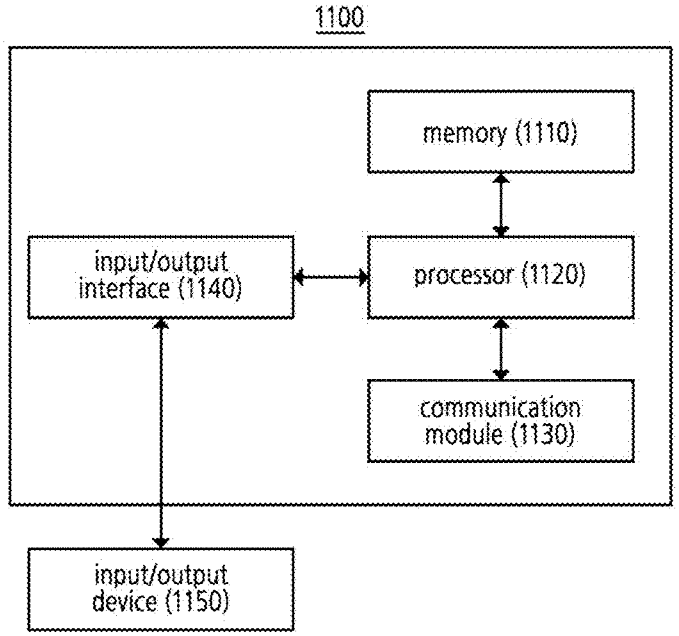
FIG. 11 is a block diagram showing an electronic device performing a method according to an exemplary embodiment of the present disclosure.

FIG. 11 is a block diagram showing an electronic apparatus which performs a method according to exemplary embodiments of the present disclosure. Although FIG. 11 describes the electronic apparatus 1100 as one physical device, the electronic apparatus 1100 may be implemented in a form in which a plurality of devices are interlocked with each other (e.g., distributed computing) according to exemplary embodiments.

In some exemplary embodiments, the electronic apparatus 1100 may include a memory 1110 and a processor 1120, as shown in FIG. 11. In some other exemplary embodiments, all or some of the communication module 1130, the input/output interface 1140, and other units may be further included.

The memory 1110 may be a recording medium readable by an electronic device (e.g., a computer), and may include permanent mass storage devices such as a random access memory (RAM), a read-only memory (ROM), and a disk drive. Herein, the ROM and the permanent mass storage devices may be separated from the memory 1110 and included as a separate permanent storage device. Also, the memory 1110 may store an operating system and at least one program code (as an example, a program such as a computer program stored in a recording medium included in the electronic apparatus 1100 for controlling the electronic apparatus 1100 to perform methods according to exemplary embodiments of the present disclosure). Such software components may be loaded from a recording medium readable by an electronic device separate from the memory 1110. The recording medium readable by such a separate electronic device may include a recording medium readable by an electronic device such as a floppy drive, a disk, a tape, a DVD/CD-ROM drive, a memory card, and the like. In another exemplary embodiment, the software components may be loaded into the memory 1110 through the communication module 1130 rather than a recording medium readable by an electronic apparatus.

The processor 1120 may be configured to process instructions of a program such as a computer program by performing basic arithmetic, logic, and input/output operations. The instructions may be provided to the processor 1120 by the memory 1110 or the communication module 1130. For example, the processor 1120 may be configured to execute an instruction received according to a program code loaded in the memory 1110. In a more specific example, the processor 1120 may sequentially execute an instruction according to a code of a computer program loaded in the memory 1110 and perform the image processing according to an exemplary embodiment of the present disclosure. The communication module 1130 may provide a function for communicating with other physical devices through a communication network such as a computer network. For example, an exemplary embodiment of the present disclosure may be performed in such a way that the processor 1120 of the electronic apparatus 1100 performs some of the processes of the present exemplary embodiment and other physical devices (e.g., electronic devices such as other computers which are not shown) of the communication network perform the remaining processes, so that the processing results are exchanged through a communication network and the communication module 1130.

The input/output interface 1140 may be a means for interfacing with the input/output device 1150. For example, in an input/output device 1150, the input device may include a device such as a keyboard or a mouse, and the output device may include a device such as a display or a speaker. In FIG. 11, the input/output device 1150 may be depicted as a device separate from the electronic apparatus 1100, but the electronic apparatus 1100 may be implemented in such a way that the input/output device 1150 is included in the electronic apparatus 1100 according to an exemplary embodiment.

The apparatus described above may be implemented as a hardware component, a software component, and/or a combination of the hardware component and the software component. For example, the devices and the components described in exemplary embodiments may be implemented using one or more general-purpose computers or special-purpose computers, such as a processor, a controller, an arithmetical logic unit (ALU), a digital signal processor, a microcomputer, a field programmable gate array (FPGA), a programmable logic unit (PLU), a microprocessor, or any other device capable of executing and responding to instructions. The electronic apparatus 1100 may perform an operating system (OS) and one or more software applications executed on the operating system. In addition, the electronic apparatus 1100 may access, store, manipulate, process and generate data in response to an execution of software. For the convenience of understanding, it may be sometimes described that one electronic apparatus 1100 is used, but those skilled in the art may recognize that the electronic apparatus 1100 may include a plurality of processing elements and/or a plurality of types of processing elements. For example, the electronic apparatus 1100 may include a plurality of processors or one processor and one controller. In addition, other processing configurations may be possible, such as parallel processors.

The software may include a computer program, a code, an instruction, or a combination of one or more thereof, and may configure the electronic apparatus 1100 to operate as desired or may independently or collectively command the electronic apparatus 1100. Software and/or data may be embodied in any type of machines, components, physical devices, computer storage mediums, or devices in order to be interpreted by an electronic apparatus 1100 or to provide instructions or data to an electronic apparatus 1100. The software may be distributed over networked computer systems and stored or executed in a distributed manner. The software and data may be stored in a recording medium readable by one or more computers.

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium. A processor and a memory may be supplemented by, or integrated into, a special purpose logic circuit.

The processor may run an operating system (OS) and one or more software applications that run on the OS. The processor device also may access, store, manipulate, process, and create data in response to execution of the software. For purpose of simplicity, the description of a processor device is used as singular, however, one skilled in the art will be appreciated that a processor device may include multiple processing elements and/or multiple types of processing elements. For example, a processor device may include multiple processors or a processor and a controller. In addition, different processing configurations are possible, such as parallel processors.

Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

It should be understood that the example embodiments disclosed herein are merely illustrative and are not intended to limit the scope of the invention. It will be apparent to one of ordinary skill in the art that various modifications of the example embodiments may be made without departing from the spirit and scope of the claims and their equivalents.

What is claimed is:

1. An image processing method implemented by an electronic apparatus, the image processing comprising:

(a) a step of extracting a first face feature from an input image including a first face image;

(b) a step of generating a second face feature by combining the extracted first face feature and a virtual face feature;

(c) a step of generating a second face image on the basis of the generated second face feature; and (d) a step of generating an output image by substantially replacing the first face image in the input image with the generated second face image, wherein the step (a) comprises using a first encoder that generates a first feature vector corresponding to the first face feature on the basis of the first face image, the step (b) comprises using a mapping network that generates a second feature vector, corresponding to the second face feature—by combining the first feature vector and a virtual feature vector, corresponding to the virtual face feature, the step (c) comprises using a decoder that generates the second face image on the basis of the second feature vector, wherein the step (b) further comprises:

using a second encoder that generates the virtual feature vector from the virtual face image, and combining the first feature vector with the generated virtual feature vector using the mapping network, and wherein the second encoder comprises a pre-trained ArcFace image encoder.

2. The image processing method of claim 1, wherein the first encoder hierarchically comprises a plurality of residual down-sampling blocks, and the decoder hierarchically comprises a plurality of residual up-sampling blocks.

3. The image processing method of claim 1, wherein the step (a) comprises:

detecting the first face image from the input image, performing a landmark detection and face alignment on the detected first face image, and extracting the first face feature on the basis of a result of the landmark detection and face alignment.

4. The image processing method of claim 1, wherein the step (b) comprises:

(b1) selecting at least one of a plurality of pre-generated images, each of the pre-generated images comprising at least one virtual face image, on the basis of the input image, (b2) extracting the virtual face feature from the at least one selected pre-generated image, and (b3) combining the extracted first face feature with the extracted virtual face feature.

5. The image processing method of claim 4, wherein the step (b1) comprises selecting at least one of a plurality of pre-generated images on the basis of at least one of an age and a gender of a person corresponding to the first face image.

6. The image processing method of claim 4, wherein the step (b2) comprises:

detecting at least one virtual face image from the at least one selected pre-generated image, performing a landmark detection and face alignment on the detected virtual face image, and extracting the virtual face feature from a result of the landmark detection and face alignment.

7. The image processing method of claim 1, wherein the step (b) comprises:

(b1) selecting at least one of a plurality of virtual face features on the basis of at least one of an age and a gender of a person corresponding to the first face image, and (b2) combining the extracted first face feature with the selected virtual face feature.

8. The image processing method of claim 1, wherein the step (d) comprises generating the output image by combining the generated second face image and a remaining area of the input image, wherein the remaining area is the area excluding an area corresponding to the first face image in the input image.

9. The image processing method of claim 1, wherein the step (d) comprises:

rearranging the generated second face image to fit according to the input image, and combining the rearranged second face image with the remaining area by blending a boundary between the rearranged second face image and a remaining area of the input image, wherein the remaining area is the area excluding an area corresponding to the first face image in the input image.

10. An image processing apparatus comprising:

a first face feature extraction unit that extracts a first face feature from an input image including a first face image;

a second face feature generation unit that generates a second face feature by combining the extracted first face feature and a virtual face feature;

a second face image generation unit that generates a second face image on the basis of the generated second face feature; and an output image generation unit that generates an output image by substantially replacing the first face image in the input image with the generated second face image, wherein the first face feature extraction unit comprises a first encoder that generates a first feature vector corresponding to the first face feature on the basis of the first face image, the second face feature generation unit comprises a mapping network that generates a second feature vector corresponding to the second face feature by combining the first feature vector and a virtual feature vector corresponding to the virtual face feature, and the second face image generation unit comprises a decoder that generates the second face image on the basis of the second feature vector, wherein the image processing apparatus further comprising a virtual face feature generation unit that generates the virtual face feature on the basis of an estimation result with respect to an age and a gender of a person corresponding to the first face image, wherein the virtual face feature generation unit further comprises a second encoder that generates a virtual feature vector from a virtual face image selected on the basis of the estimation result, and wherein the second encoder comprises a pre-trained ArcFace image encoder.

11. The image processing apparatus of claim 10, wherein the first encoder hierarchically comprises a plurality of residual down-sampling blocks, and the decoder hierarchically comprises a plurality of residual up-sampling blocks.

12. The image processing apparatus of claim 11, wherein the decoder utilizes only a part of outputs of a plurality of residual down-sampling blocks.

13. The image processing apparatus of claim 12, wherein the part is outputs of N low-layer residual down-sampling blocks among outputs of a plurality of residual down-sampling blocks, where N is a natural number smaller than the number of a plurality of residual down-sampling blocks.

14. The image processing apparatus of claim 11, wherein the decoder utilizes all or only a part of outputs of a plurality of residual down-sampling blocks and selects the utilized outputs according to a given condition.

* * * * *